United States Patent
Eklund et al.

(10) Patent No.: US 10,367,234 B2
(45) Date of Patent: Jul. 30, 2019

(54) BATTERY HAVING INTEGRATED SAFETY CONTROLLER AND POWER MANAGEMENT CONTROLLER

(71) Applicant: Microsoft Technology Licensing, LLC, Redmond, WA (US)

(72) Inventors: Esa Eklund, Salo (FI); Seppo Järvensivu, Halikko (FI); Anna-Maria Henell, Helsinki (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 239 days.

(21) Appl. No.: 15/243,711

(22) Filed: Aug. 22, 2016

(65) Prior Publication Data

US 2018/0053969 A1    Feb. 22, 2018

(51) Int. Cl.
*H01M 10/42* (2006.01)
*H01M 10/48* (2006.01)

(52) U.S. Cl.
CPC ...... *H01M 10/4257* (2013.01); *H01M 10/488* (2013.01); *H01M 2010/4271* (2013.01); *H01M 2220/00* (2013.01); *H01M 2220/30* (2013.01)

(58) Field of Classification Search
CPC ............. H01M 10/4257; H01M 10/44; H01M 10/488; H01M 2010/4271; H01M 2010/4278; H01M 2220/20; H01M 2220/30; H01M 2220/00
See application file for complete search history.

(56) References Cited

U.S. PATENT DOCUMENTS

| | | |
|---|---|---|
| 5,606,242 A | 2/1997 | Hull et al. |
| 6,065,122 A | 5/2000 | Wunderlich et al. |
| 6,653,816 B2 | 11/2003 | Peek et al. |
| 6,879,133 B1 | 4/2005 | Geren |
| 7,319,304 B2 | 1/2008 | Veloo et al. |
| 7,705,557 B2 | 4/2010 | Kotikalapoodi et al. |
| 8,143,860 B2 | 3/2012 | Gangsto et al. |
| 8,994,217 B2 | 3/2015 | Cho et al. |
| 9,912,017 B1* | 3/2018 | Kuo ............... H01M 10/46 |
| 2004/0048142 A1 | 3/2004 | Marusak et al. |
| 2005/0275372 A1 | 12/2005 | Crowell |
| 2006/0139003 A1* | 6/2006 | Fischer ......... H01M 10/4257 320/132 |
| 2013/0101874 A1 | 4/2013 | Pevear |
| 2014/0342193 A1* | 11/2014 | Mull .............. H01M 10/4257 429/50 |
| 2017/0077559 A1* | 3/2017 | Beaston ......... H01M 10/4257 |

FOREIGN PATENT DOCUMENTS

EP    2846394 A1    3/2015

OTHER PUBLICATIONS

"Cymbet Products", Published on: Oct. 2, 2014, 4 pages, Available at: http://www.cymbet.com/products/.

* cited by examiner

*Primary Examiner* — Anca Eoff (57) ABSTRACT

A battery having integrated safety and power management controller is described. In an embodiment a battery, comprises: at least one battery cell; and a printed circuit board, PCB, comprising a safety controller of the at least one battery cell and a power management controller of a device using a power of the battery; wherein the power management controller comprises power outputs directly outputting a power of the battery to at least one module of the device; and wherein the safety controller and the power management controller are integrated into the same PCB of the battery.

20 Claims, 7 Drawing Sheets

BATTERY HAVING INTEGRATED SAFETY CONTROLLER AND POWER MANAGEMENT CONTROLLER

BACKGROUND

Rechargeable batteries may be used in multiple applications, ranging from portable music devices, to mobile phones, to electric vehicles. Batteries are constructed from individual battery cells, for example one or more lithium ion cells either in parallel or series configuration. Batteries also have a small printed circuit board, PCB, containing a mandatory safety controller, for example a safety circuit, to protect the cells against excess voltage, current, temperature. Furthermore the battery has connections from anode and cathode. The battery has also connections towards the system battery. From an integration point of view, the construction is not space efficient and may consume a lot of critical physical space within the device.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

A battery having integrated safety and power management controller is described. In an embodiment a battery, comprises: at least one battery cell; and a printed circuit board, PCB, comprising a safety controller of the at least one battery cell and a power management controller of a device using a power of the battery; wherein the power management controller comprises power outputs directly outputting a power of the battery to at least one module of the device; and wherein the safety controller and the power management controller are integrated into the same PCB of the battery.

In other embodiments, a device or a mobile device having the battery are discussed.

Many of the attendant features will be more readily appreciated as they become better understood by reference to the following detailed description considered in connection with the accompanying drawings.

DESCRIPTION OF THE DRAWINGS

The present description will be better understood from the following detailed description read in light of the accompanying drawings, wherein.

Like references are used to designate like parts in the accompanying drawings.

DETAILED DESCRIPTION

The detailed description provided below in connection with the appended drawings is intended as a description of the embodiments and is not intended to represent the only forms in which the embodiment may be constructed or utilized. However, the same or equivalent functions and structures may be accomplished by different embodiments.

Although the embodiments may be described and illustrated herein as being implemented in a mobile device, for example a smartphone, this is only an example implementation and not a limitation. As those skilled in the art will appreciate, the present embodiments are suitable for application in a variety of different types of appliances and devices powered by rechargeable batteries and having a limited available space within the device, for example mobile phones, portable media players, tablets, portable computers, tools with rechargeable batteries, smart watches, wearable electronics, etc.

A part of, or all, energy and/or power management functions of a device, which is powered by one or more battery cells and connected to it, are integrated in the printed circuit board, PCB, of the battery, according to an embodiment. Power management controller and battery safety controller can be integrated into the PCB of the battery. Furthermore, the PCB of the battery may be an integral part of the battery structure. A battery pack may contain the PCB, for example the PCB may be situated inside a housing of the battery. Consequently, physical space inside the housing of the device having the battery may be saved, for example for height and area, especially in case battery and display are stacked, as they typically are in mobile and tablet designs. Furthermore, current losses between the battery and the controller can be reduced by integrating some or all of the power management functions into the battery PCB.

Connections may be constructed directly to the power management controller according to an embodiment. Various connections having relatively small current may start from the power management controller of the battery PCB, and continue to the usage modules of the device, delivering power to them. A large current input may be connected into the power management controller from the battery. Thereby the level of integration may be improved, and there may be no need for separate or specific connections running between the battery and the usage modules.

Resistance, and the power losses they cause, between the battery and power management controller can be reduced by integrating part or all power management functions into the battery PCB. This may also reduce or eliminate the requirement for a connector between the battery and the power management controller, which depending on the connector causes several tens of milliohm resistance, possibly even hundreds of milliohms after aging and wearing.

Figure 1:
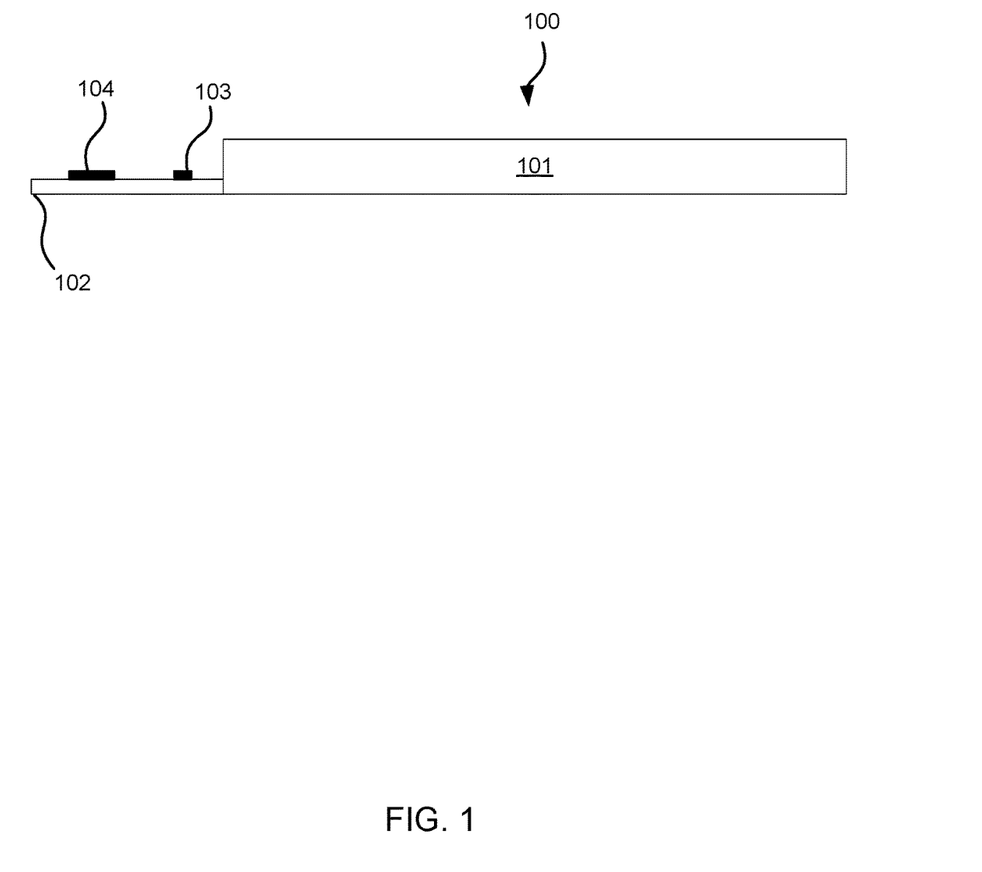
FIG. 1 illustrates a schematic representation of a side view of a battery having a power management controller and a safety controller integrated on PCB, according to an embodiment.

FIG. 1 illustrates a schematic representation of a side view of a battery 100 having an integrated power management controller 104 and safety controller 103 on PCB 102, according to an embodiment.

The battery 100 comprises one or more battery cells 101. Battery 100 of the device is constructed from individual battery cells 101. They may, for example, be one or more lithium-ion cells, which are either in parallel or series configuration. Furthermore, the battery 100 has a PCB 102. The PCB 102 may be located at an end of the battery. However, other locations next to the battery may be possible, depending on the design of the device and housing of the device, in which the battery 100 is used. The PCB comprises a safety controller 103. The safety controller 103 may be an integrated circuit. The safety controller 103 may, for example, be a mandatory safety circuitry to protect the cells 101 against excess voltage, current, or temperature, etc.

According to an embodiment, the safety circuitry includes a Li-ion protector that controls back-to-back FET switches. These switches can be opened to protect the pack against fault conditions such as overvoltage, under voltage, and overcurrent. The safety circuit may also include a temperature sensitive three-terminal fuse that will open due to prolonged overcurrent or over temperature, or it can be forced to open by redundant protection circuitry in case there is a fault where the primary protection circuitry fails to respond. The safety circuit measures the amount of charge entering and leaving the cell 101. The safety circuit may use one of several techniques to sense current, including employing a current sense resistor. When current flows through the current sense resistor a voltage is created across the resistor. By sensing this voltage across time, in addition to sensing the voltage of the cell 101, the safety circuit is able to measure the power flowing into and out of the cell 101.

Referring to FIG. 1, the PCB 102 also comprises a power management controller 104, for example a power management circuit. The power management circuit may be an integrated circuit, for managing power requirements of the device. For example, it may refer to a wide range of chips, however most include some form of electronic power conversion and/or relevant power control functions. The power management circuit is included in battery-operated devices, such as mobile phones and portable media players, to decrease the amount of space required, when integrated on the battery PCB 102. The power management controller 104 assimilates various battery data and transports it to a processor across a data bus. The data bus may be as simple as a one-wire interface. Typical battery data includes cell capacity, cell state of charge, cell voltage, temperature, charging status, time, pressure and the like. Additional information maintained by the power management controller 104 includes date of manufacture, service date, number of cycles used, preferred charging instructions and other cell specific data.

The controllers 103 and 104 can be integrated into the PCB 102. They may take a small physical space being integrated into the PCB 102 of the battery 100. Furthermore, although FIG. 1 illustrates them as separated integrated circuits, they may be integrated into a single circuit (not shown in FIG. 1) or block (not shown in FIG. 1) of the PCB 102. An integrated circuit, or monolithic integrated circuit, (also referred to as an IC, a chip, or a microchip), which comprises the safety controller 103 and/or the power management controller 104, is a set of electronic circuits on one small plate ("chip") of semiconductor material, normally silicon. This can be made much smaller than a discrete circuit made from independent electronic components. ICs can be made very compact, having up to several billion transistors and other electronic components in an area the size of a human fingernail.

Figure 2:
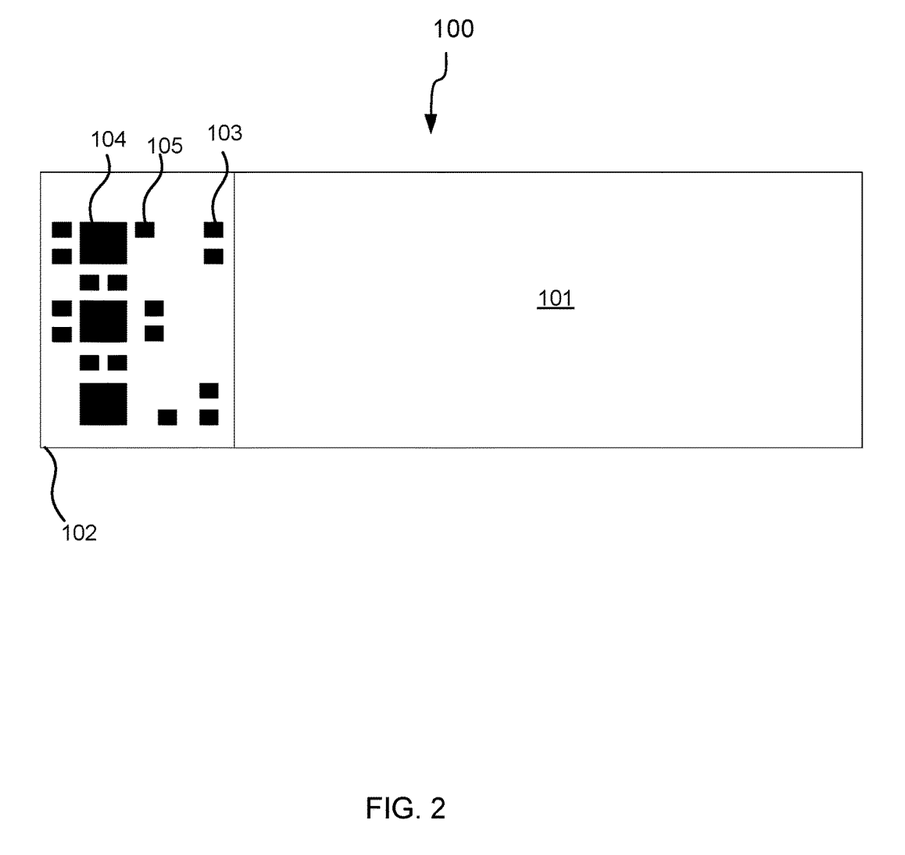
FIG. 2 illustrates a schematic representation of a top view of a battery having a power management controller and safety controller integrated on PCB, according to an embodiment.

FIG. 2 illustrates a schematic representation of a top view of a battery 100 having an integrated power management controller 104 and safety controller 103, on PCB 102, according to an embodiment. Embodiment of FIG. 2 may be a top view of the embodiment of FIG. 1. The PCB 102 of FIG. 2 further includes other components 105, which may be relevant for the battery 100 and connections to the device. Furthermore, FIG. 2 illustrates more than one circuit block for the power management controller 104 and also for the safety controller 103.

Figure 3:
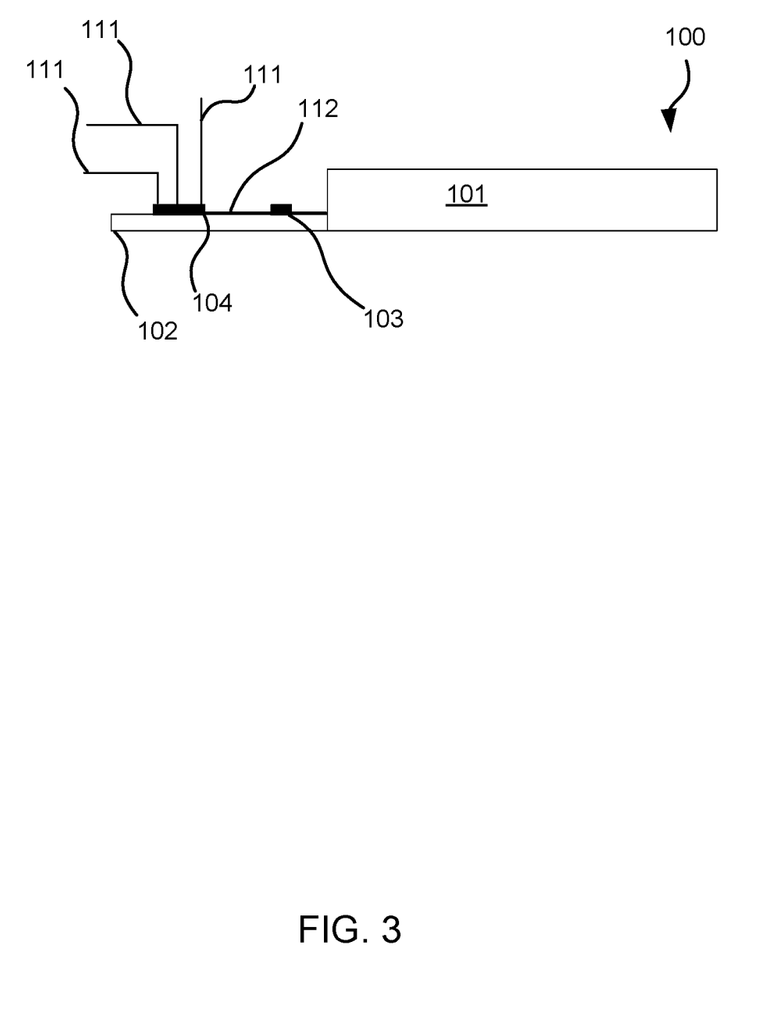
FIG. 3 illustrates a schematic representation of a side view of a battery having an integrated power management, and illustrating power outputs and power input, according to an embodiment.

FIG. 3 illustrates a schematic representation of a side view of a battery 100 having an integrated power management controller 104, and illustrating power outputs 111 and power input 112, according to an embodiment. Various power outputs 111 may connect the power management controller 104 to usage modules of the device, which require power. Current of the outputs 111 may be relatively small. The outputs 111 are directly connected to the power management controller 104. This may increase the level of integration. Furthermore, the power management controller 104 is connected to input 112. The input 112 receives power from the cell 101, via or controlled by the safety controller 103. According to an embodiment, there is a single input 112. Input 112 may receive relatively large current from the battery 100. Thus, the PCB 102 has connections for anode and cathode of the battery 100 as input 112 and connections towards the system battery as outputs 111. Because the outputs 111 are directly connected to the power management controller 104, there is no need to have an output power connection from the cells 101 to the device. The power connected may be coupled directly from the power management controller 104. Current flows from the cells 101 to the power management controller 104 via input 112, and further from the power management controller 104 to the device via outputs 111.

Figure 4:
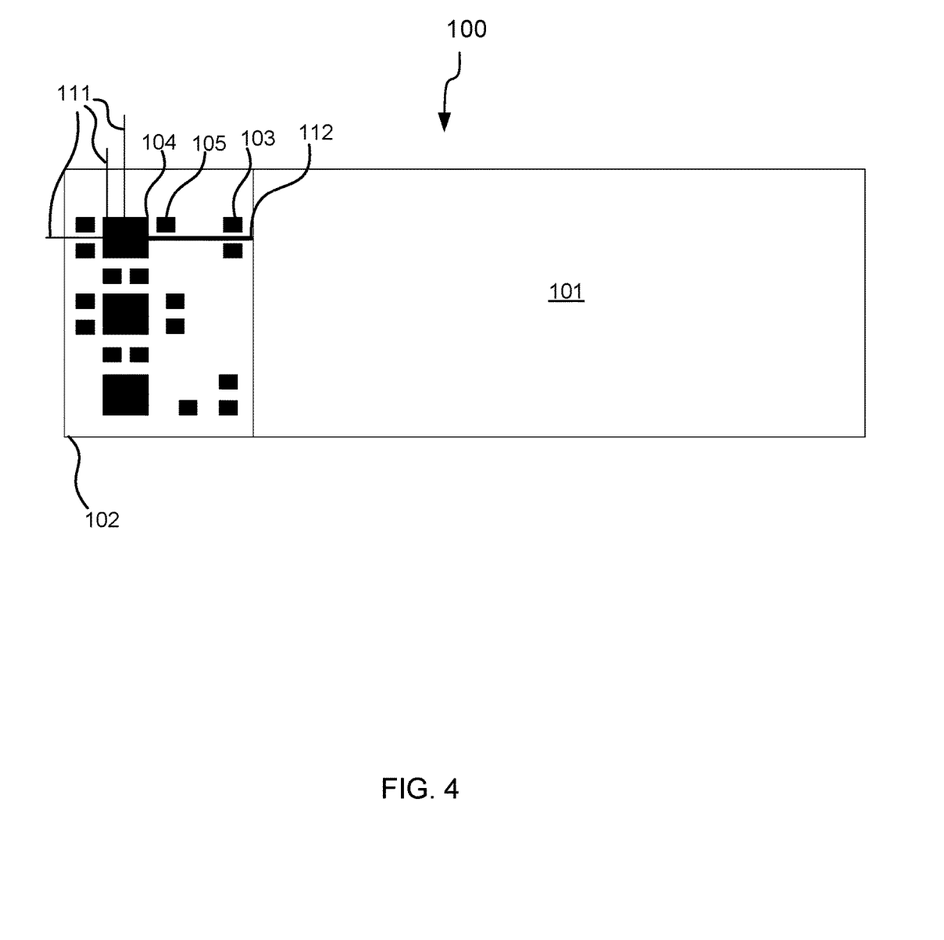
FIG. 4 illustrates a schematic representation of a top view of a battery having an integrated power management, and illustrating power outputs and power input, according to an embodiment.

FIG. 4 illustrates a schematic representation of a top view of a battery 100 having an integrated power management controller 104 and illustrating power outputs 111 and power input 112, according to an embodiment. The embodiment of FIG. 4 may be a top view of the embodiment of FIG. 3. The PCB 102 of FIG. 4 further includes other components 105, which may be relevant for the battery 100 and connection to the device. Furthermore, FIG. 4 illustrates more than one circuit block for the power management controller 104 and also for the safety controller 103.

Figure 5:
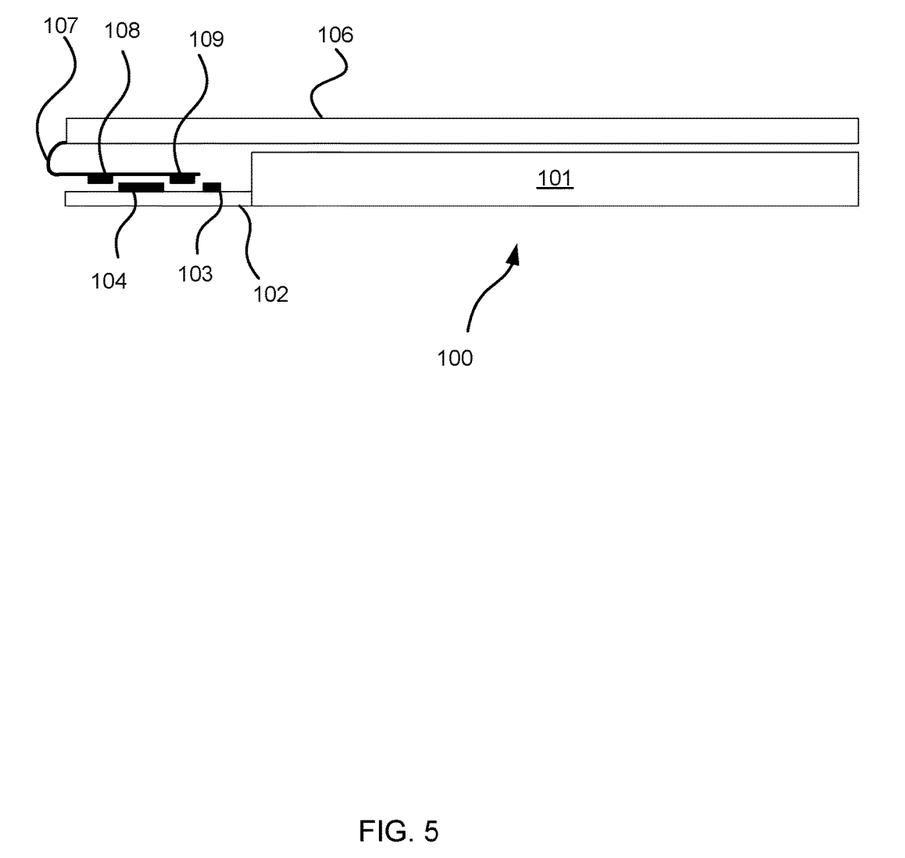
FIG. 5 illustrates a schematic representation of a side view of a battery and a display stacked on top of each other, according to an embodiment.

FIG. 5 illustrates a schematic representation of a side view of a battery 100 and a display 106 stacked on top of each other, according to an embodiment.

Often in a mobile device construction a battery 100 and a display 106 are stacked on top of each other. Display 106 comprises a panel itself and a flex 107. The flex 107 extends from the display 106. It may be bendable or bended into a shape. The flex 107 has connection into the display 106. Furthermore the flex 107 is configured for a driver IC 108 and supporting components 109. According to an embodiment also the power management controller 104 functions or touch related components may be implemented into the flex 107. Due to the sensitivity of the signals, a driver IC 108 location is typically fixed and there is not much freedom to optimize the location based on other factors besides the display panel 106 itself. An area, between the display 106 and a device outer surface, is minimized. Furthermore, an area, between the display 106 and the battery 100, is limited.

According to an embodiment of FIG. 5, the display flex 107 may be bent under the display panel 106 generally increasing the height of the display stack. However, overall stack height and area can be minimized by co-designing the battery PCB 102 together with the display module 106 and the flex 107. The height of the PCB 102 may be smaller than the height of the cells 101. Consequently, there is an available space on top of the PCB 102. The flex 107 may be conveniently bent and configured partly into this space. The flex 107 may be in contact with the PCB 102, although FIG. 5 illustrates a gap between these parts.

Figure 6:
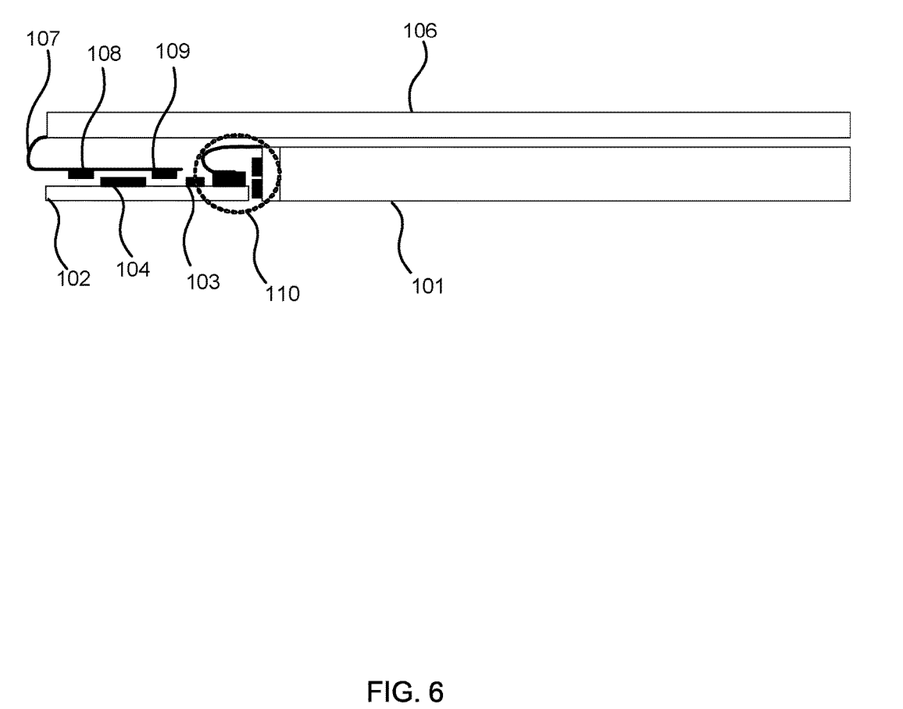
FIG. 6 illustrates a schematic representation of a side view of a battery and a display stacked on top of each, and further illustrating a space that can be saved, according to an embodiment.

FIG. 6 illustrates a schematic representation of a side view of a battery 100 and a display 106 stacked on top of each and further illustrating a space 110 that can be saved, according to an embodiment. The embodiment of FIG. 6 illustrates a typical flex of a known battery, which can be omitted in the embodiments. This is illustrated by the flex of the battery in the dashed circle showing the space 110, which may be made available for integration and miniaturization purposes.

Figure 7:
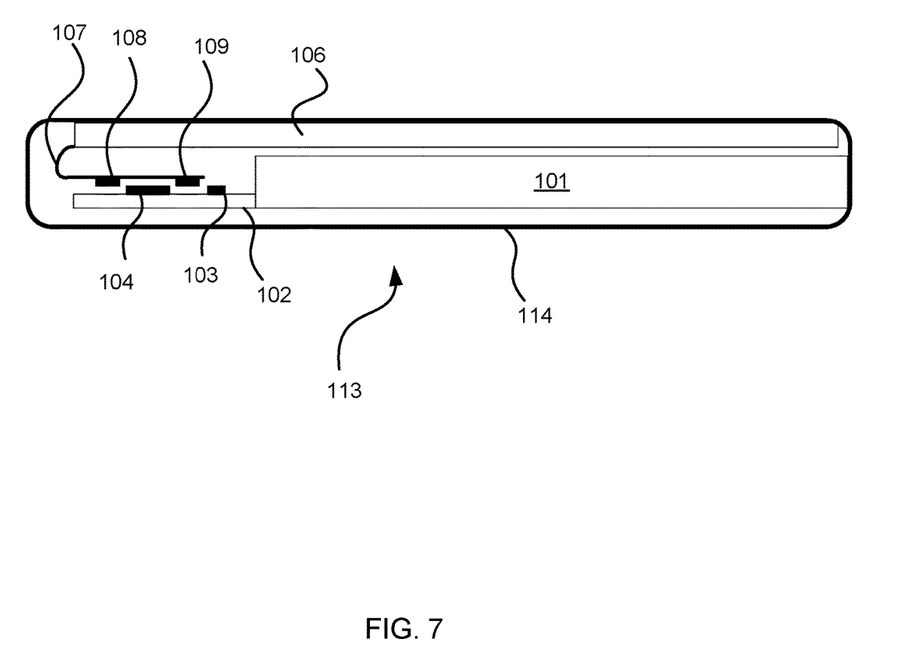
FIG. 7 illustrates a schematic representation of a side view of a device having a housing encapsulating the battery, according to an embodiment.

FIG. 7 illustrates a schematic representation of a side view of a device 113 having a housing 114 encapsulating the battery 100 and partly the display 106, according to an embodiment. Because the physical size of the device 113 is one factor, and it cannot be too big for user's convenience, any improvement in the level of integration, which may be achieved by the embodiments, is a positive factor. As may be illustrated by FIG. 7, the PCB 102 and the flex 107 co-operates within the housing 114 inside the device 113, and also within the fictional framework (not shown in FIG. 7) established by the display 106 and the cell 101. The fictional framework may illustrate an outer upper surface of the display 106, lower outer surface of the cell 101 and both ends of the display 106 and the cell 101.

According to an embodiment, a rechargeable battery powered device 113, for example as shown in FIG. 7 may be established with the features of FIGS. 1 to 6.

The power management controller 104 has been described to control the power from the battery 100. According to an embodiment, the power management controller 104 may also control the power, which is inputted to the battery 100. For example, the power management controller 104 may have, and be integrated with, some, or all, of the battery charging functionalities.

The methods and functionalities described herein may be performed by software in machine readable form on a tangible storage medium e.g. in the form of a computer program comprising computer program code means adapted to perform all the functions and the steps of any of the methods described herein when the program is run on a computer and where the computer program may be embodied on a computer readable medium. Examples of tangible storage media include computer storage devices such as disks, thumb drives, memory etc. and do not include propagated signals. The software can be suitable for execution on a parallel processor or a serial processor such that the functionalities may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions. Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Any range or device value given herein may be extended or altered without losing the effect sought. Also any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

The embodiments illustrated and described herein as well as embodiments not specifically described herein but within the scope of aspects of the disclosure constitute exemplary means for integrating safety controller and power management controller. For example, the elements illustrated in FIG. 1 to FIG. 7 constitute exemplary means for at least one battery cell; exemplary means for a printed circuit board, PCB, exemplary means for a safety controller of the at least one battery cell; exemplary means for a power management controller of a device using a power of the battery; exemplary means for outputting a power of the battery to at least one module of the device; and exemplary means for integrating the safety controller and the power management controller into the PCB of the battery.

An embodiment relates to a battery, comprising: at least one battery cell; and a printed circuit board, PCB, comprising a safety controller of the at least one battery cell and a power management controller of a device using a power of the battery; wherein the power management controller comprises power outputs directly outputting a power of the battery to at least one module of the device; and wherein the safety controller and the power management controller are integrated into the same PCB of the battery.

Alternatively or in addition to the above, the power management controller comprises an integrated circuit that is integrated into the PCB. Alternatively or in addition to the above, the safety controller comprises an integrated circuit that is integrated into the PCB. Alternatively or in addition to the above, the safety controller and the power management controller comprises a single united circuit integrated into the PCB. Alternatively or in addition to the above, the power outputs are configured directly on the power management controller, and a power output of the at least one battery cell is configured only to the PCB without a direct connected to the at least one module. Alternatively or in addition to the above, the power outputs carry small currents. Alternatively or in addition to the above, the power management controller comprises an input receiving a large current from the at least one battery cell. Alternatively or in addition to the above, further including a battery housing encapsulating the at least one battery cell and the PCB. Alternatively or in addition to the above, the PCB is positioned at an end of the battery. Alternatively or in addition to the above, the at least one module comprises a display module, wherein the display module is configured to be stacked on top of the battery. Alternatively or in addition to the above, the display module comprises a flex having a connection interface of the display, wherein the flex is configured on top of the PCB and the connection interface is configured to contact the PCB of the battery. Alternatively or in addition to the above, the flex is configured to be bent under the display module. Alternatively or in addition to the above, the power management controller is configured to control a power usage of the battery for the device. Alternatively or in addition to the above, the safety controller is configured to protect the at least one cell against excess voltage, current or temperature.

An embodiment relates to a device, comprising: a battery, comprising at least one battery cell; and a printed circuit board, PCB, comprising a safety controller of the at least one battery cell and a power management controller of the device using a power of the battery; wherein the power management controller comprises power outputs directly outputting a power of the battery to at least one module of the device; wherein the safety controller and the power management controller are integrated into the PCB of the battery.

Alternatively or in addition to the above, further including a display module, wherein the display module is configured to be stacked on top of the battery. Alternatively or in addition to the above, a housing of the device encapsulates the battery and at least edges of the display module. Alternatively or in addition to the above, the power management controller comprises an integrated circuit that is integrated into the PCB, and wherein the safety controller comprises an integrated circuit that is integrated into the PCB. Alternatively or in addition to the above, the power outputs are configured directly on the power management controller, and a power output of the at least one battery cell is configured only to the PCB without a direct connected to the at least one module.

An embodiment relates to a mobile device, comprising: a battery, comprising at least one battery cell; and a printed circuit board, PCB, comprising a safety controller of the at least one battery cell and a power management controller of a device using a power of the battery; wherein the safety controller and the power management controller are integrated into the same PCB of the battery.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the embodiments described above may be combined with aspects of any of the other embodiments described to form further embodiments without losing the effect sought.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A battery, comprising:
   at least one battery cell; and
   a printed circuit board (PCB) comprising a safety controller of the at least one battery cell and a power management controller of a device using a power of the battery;
   wherein the power management controller comprises power outputs directly outputting a power of the battery to at least one module of the device; and
   wherein the safety controller and the power management controller are integrated into the same PCB of the battery; and
   wherein the at least one module comprises a display module, wherein the display module is configured to be stacked on top of the battery and comprises a flex having a connection interface of the display module, wherein the flex is configured on top of the PCB and the connection interface is configured to contact the PCB of the battery.

2. The battery of claim 1, wherein the power management controller comprises an integrated circuit that is integrated into the PCB.

3. The battery of claim 1, wherein the safety controller comprises an integrated circuit that is integrated into the PCB.

4. The battery of claim 1, wherein the safety controller and the power management controller comprises a single united circuit integrated into the PCB.

5. The battery of claim 1, wherein the power outputs are configured directly on the power management controller, and a power output of the at least one battery cell is configured only to the PCB without a direct connection to the at least one module.

6. The battery of claim 1, further including a battery housing encapsulating the at least one battery cell and the PCB.

7. The battery of claim 1, wherein the PCB is positioned at an end of the battery.

8. The battery of claim 1, wherein the flex is configured to be bent under the display module.

9. The battery of claim 1, wherein the power management controller is configured to control a power usage of the battery for the device.

10. The battery of claim 1, wherein the safety controller is configured to protect the at least one battery cell against excess voltage, current or temperature.

11. A device, comprising:
    a battery, comprising:
      at least one battery cell,
      a printed circuit board (PCB) comprising a safety controller of the at least one battery cell and a power management controller of the device using a power of the battery,
      wherein the power management controller comprises power outputs directly outputting a power of the battery to at least one module of the device,
      wherein the safety controller and the power management controller are integrated into the PCB of the battery; and
    wherein the at least one module comprises a display module, wherein the display module is configured to be stacked on top of the battery and comprises a flex having a connection interface of the display module, wherein the flex is configured on top of the PCB and the connection interface is configured to contact the PCB of the battery.

12. The device of claim 11, wherein a housing of the device encapsulates the battery and at least edges of the display module.

13. The device of claim 11, wherein the power management controller comprises an integrated circuit that is integrated into the PCB, and wherein the safety controller comprises an integrated circuit that is integrated into the PCB.

14. The device of claim 11, wherein the power outputs are configured directly on the power management controller, and a power output of the at least one battery cell is configured only to the PCB without a direct connection to the at least one module.

15. A mobile device, comprising:
a battery, comprising:
at least one battery cell; and
a printed circuit board (PCB) comprising a safety controller of the at least one battery cell and a power management controller of the mobile device using a power of the battery,
wherein the power management controller comprises power outputs directly outputting a power of the battery to at least one module of the mobile device, and
wherein the safety controller and the power management controller are integrated into the same PCB of the battery; and
wherein the at least one module comprises a display module, wherein the display module is configured to be stacked on top of the battery and comprises a flex having a connection interface of the display module, wherein the flex is configured on top of the PCB and the connection interface is configured to contact the PCB of the battery.

16. The mobile device of claim 15, wherein a housing of the mobile device encapsulates the battery and at least edges of the display module.

17. The mobile device of claim 15, wherein the power management controller comprises an integrated circuit that is integrated into the PCB, and wherein the safety controller comprises an integrated circuit that is integrated into the PCB.

18. The mobile device of claim 15, wherein the power outputs are configured directly on the power management controller, and a power output of the at least one battery cell is configured only to the PCB without a direct connection to the at least one module.

19. The mobile device of claim 15, wherein the flex is configured to be bent under the display module.

20. The mobile device of claim 15, wherein the power management controller is configured to control a power usage of the battery for the mobile device.

* * * * *